(12) United States Patent
Kraus et al.

(10) Patent No.: US 8,386,444 B2
(45) Date of Patent: Feb. 26, 2013

(54) TECHNIQUES FOR SELECTIVE COMPRESSION OF DATABASE INFORMATION

(75) Inventors: Timothy Brent Kraus, Carlsbad, CA (US); John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 549 days.

(21) Appl. No.: 11/648,332

(22) Filed: Dec. 29, 2006

(65) Prior Publication Data

US 2008/0162523 A1 Jul. 3, 2008

(51) Int. Cl.
*G06F 17/30* (2006.01)
(52) U.S. Cl. .................. 707/693; 707/999.101; 711/152
(58) Field of Classification Search .................. None
See application file for complete search history.

(56) References Cited

U.S. PATENT DOCUMENTS

| | | | |
|---|---|---|---|
| 5,546,575 A | 8/1996 | Potter et al. | |
| 5,903,895 A * | 5/1999 | Hoffman et al. | 708/112 |
| 6,006,232 A | 12/1999 | Lyons | |
| 6,493,728 B1 | 12/2002 | Berger | |
| 6,691,132 B2 | 2/2004 | Walker et al. | |
| 6,874,061 B1 * | 3/2005 | Bridge | 711/114 |
| 7,043,686 B1 | 5/2006 | Maruyama et al. | |
| 2002/0178171 A1 | 11/2002 | Walker et al. | |
| 2004/0148301 A1 | 7/2004 | McKay et al. | |
| 2006/0123035 A1 | 6/2006 | Ivie | |
| 2006/0181441 A1 * | 8/2006 | Fallon | 341/87 |
| 2007/0282901 A1 * | 12/2007 | Garcea et al. | 707/104.1 |
| 2008/0133456 A1 * | 6/2008 | Richards et al. | 707/2 |

* cited by examiner

*Primary Examiner* — Anteneh Girma
(74) *Attorney, Agent, or Firm* — Schwegman, Lundberg & Woessner, P.A.

(57) ABSTRACT

Techniques for selective compression of database information are presented. Selective first portions of a field associated with a database table are identified along with metadata associated with the database table. The first portions and the metadata are then compressed by selecting one or more compression algorithms in response to compression capabilities associated with the algorithms.

12 Claims, 3 Drawing Sheets

TECHNIQUES FOR SELECTIVE COMPRESSION OF DATABASE INFORMATION

FIELD

The invention relates generally to database technology and more particularly to techniques for selective compression of database information.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals: such as planning, analytics, reporting, etc.

In fact, many enterprises have extremely large databases having frequent and daily transactions. The size of some of these databases and the frequency with which they are updated can be mind boggling. Thus, enterprises are continually looking for ways to decrease the size of the databases without impacting performance or usability. When the size of the database is effectively and efficiently reduced, processing throughput for database operations can also be substantially improved.

Unfortunately, compression of database information is largely applied to entire or whole tables within a database or to fields or columns of an entire or whole table. Thus, if the particular compressed table is used with any regularity there is a tradeoff in having compression against the table because the expense associated with regularly decompressing the data for use may be more expensive than just maintaining the table in an uncompressed format or may be expensive for some portions of the table but nor for other portions of the same table.

Furthermore, many times the database is poorly designed for its intended use or overly designed to accommodate situations that may never actually occur. For example, a dollar store may rarely if ever have a product for sale that exceeds $100; and yet, the database field for the sale price of the product may encompass 10 digits within a database table, when 3 digits are all that is ever used. If the database table is large then there are 7 bytes for each row, which is associated with a sales price field, unused. This can translate into a sizeable amount of data for a large database table. But, there is no ability in the existing art to selectively compress portions of a single database field; thus, either the entire field is compressed or none of the field is compressed.

Thus, it can be seen that improved and more efficient mechanisms for compression of database information are needed.

SUMMARY

In various embodiments, techniques for selective compression of database information are presented. According to an embodiment, a method for compressing database information is provided. Data extents having infrequent use within a database table are identified and file system metadata is acquired for the database table. Next, the portions of the metadata and portions of the data extents are selectively compressed.

DETAILED DESCRIPTION

Figure 1:
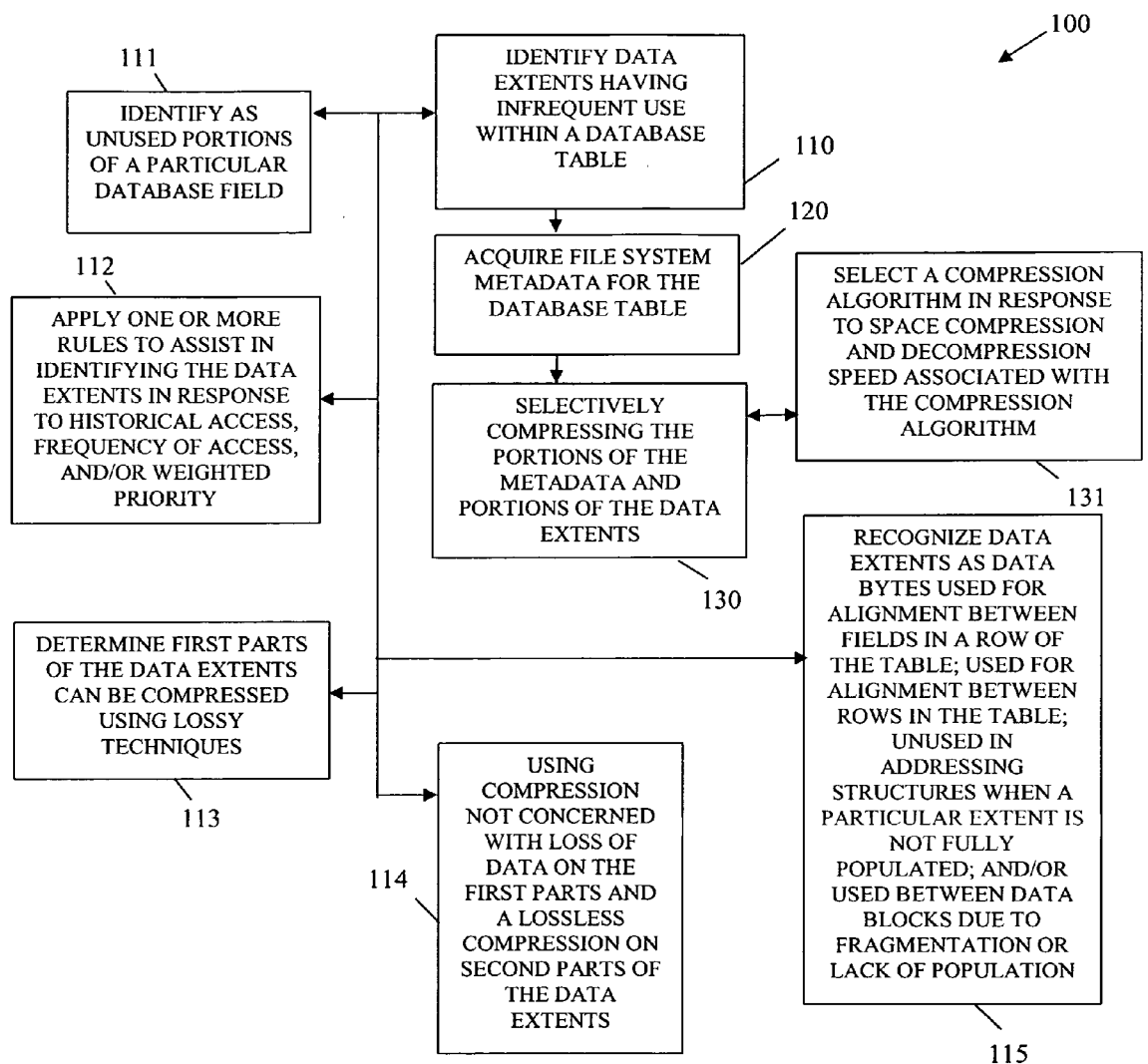
FIG. 1 is a diagram of a method for selectively compressing database information, according to an example embodiment.

FIG. 1 is a diagram of a method 100 for selectively compressing database information, according to an example embodiment. The method 100 (hereinafter "compression service") is implemented in a machine-accessible or computer-readable medium as instructions that when executed by a machine (processing device) performs the processing depicted in FIG. 1. Moreover, the compression service is optionally accessible over a network. The network may be wired, wireless, or a combination of wired and wireless.

A "database" as used herein is a relational database, or a collection of databases organized as a data warehouse. According to an embodiment, the database is a Teradata® product or service distributed by NCR Corporation of Dayton, Ohio.

The database includes a variety of enterprise information organized in tables. A table includes a variety of rows and columns. Each row includes a variety of fields. The fields (columns) and rows are defined via a table definition or schema.

Lossy compression refers to compression techniques where some information may be lost in the compression, which is not critical. Lossless compression refers to compression techniques where no information is lost during compression.

A "data extent" is a contiguous area in storage or memory having a logical unit of data. In other words, a piece of information or data included in a data extent is not fragmented but rather is contiguously recorded in memory or storage.

It is within this context that the processing associated with the compression service is now described in detail with reference to the FIG. 1.

At 110, the compression service identifies data extents having infrequent use within a database table. A variety of techniques may be used to determine which database extents have infrequent use within a database table. For example, some metadata or statistics for the database table may indicate when if ever certain database extents have been used or accessed. Some policy or configuration settings may provide a definition for what is considered to be infrequent use, such as no access within 30 days, etc. Any policy definition may be configured and used to assist the compression service in resolving what is considered infrequently use for data extents associated with the database table.

According to an embodiment, at 111, the compression service may identify the data extents as unused portions of a particular database field or column. For example, a database field for sales price may be defined as 10 digits; however the most ever used within the database may be just 3 digits. Thus, 7 digits or bytes may be recognized as unused portions of a particular database field or column associated with sales price. It is noted that other portions of the database field may be used and are those not identified as being the data extents. The data extents are associated with just unused portions of a particular database field.

In another case, at 112, the compression service may apply one or more rules to assist in identifying the data extents. This may be done in response to a variety of information embodied in the rules. For example, historical access frequency may be defined within the rules or any frequency of access. Access may also be weighted, such that certain types of prior access against the data extents are viewed as being more significant. For example, if a particular access was made for purposes of generating a report (administrative service doing a read access); then this type of an administrative read access may be viewed as being less significant and may receive a lower weighted priority from a user's direct access, which actually modifies data. The rules may be used to evaluate when and if data extents are to be used for compression.

In an embodiment, the frequency may be a count associated with access operations (reads or writes) that occurred some where in the data extent being analyzed for compression. The data extent may be viewed as file system cylinder having a variety of used data structures or pieces of data; these data structures have gaps or fillers separate them from each other on the cylinder. Any access to an extent being analyzed would be considered one access or would increase a running frequency count by 1. The frequency of a particular cylinder or data extent would then be compared to other cylinders or data extents associated with the database. Some threshold value can then be used to determine if the frequency of a particular data extent warrants compression. This ensures that infrequently accessed extents can be safely compressed because the tradeoff is low; meaning there would be infrequent decompression needed for an infrequently accessed data extent that was compressed.

In an embodiment, at 113, the compression service may identify first parts associated with the data extents that can be compressed using compression that is not concerned with what occurs with the compressed bytes. It may be that lossy compression techniques can be used in these situation; although it is to be understood that greater compression that is not concerned with recovering any of the information of the compressed bytes may be used, since the first parts are largely unused. In other words, the data extents may be associated with fillers between rows or columns, such that any actual data included in these data extents are not vital and can be compressed using any compression technique rather than a lossless compression technique.

Moreover, at 114, the compression service may actually use a lossy compression algorithm or any compression with the first parts of the data extents and use a different lossless compression on second parts of the data extents. This may be done when some first parts are never actually being used. The original definition for the particular database field may have been overly aggressive or conservative or may have been copied from another database table and first parts may actually never be used. So, using any robust compression on the first parts is perfectly permissible whereas lossless compression is more appropriate with second parts of the same field that may actually be used with some regularity within the database table.

In fact, at 115, the compression service may recognize the data extents as data bytes used for a variety of purposes within the database table. For example, the data extents may be used for alignment purposes between fields within a given row of the database table; used for alignment between rows within the database table, unused in addressing structures when a particular data extent is not fully populated or used completely; and/or used between data blocks due to fragmentation or lack of population. Essentially, the data that is typically ignored or not compressed by conventional compression algorithms is specifically identified and selectively targeted for compressing with the compression service.

At 120, the compression service acquires file system metadata for the database table. This metadata may include headers, trailers, overhead information, statistics, etc. that the file system carries with the database table. This metadata may be used very infrequently and in some cases can consume a large amount of space. The compression service identifies this metadata and permits it to be selectively compressed.

At 130, the compression service selectively compresses portions of the metadata and portions of the data extents. That is, data, which is traditionally not compressed, is specifically compressed with the compression service. In a normal situation this may not on the surface appear to be particularly beneficial; however in large transactional database tables, compression of this information can prove to be extremely beneficial by substantially reducing space and improving overall performance without any loss of information integrity.

In an embodiment, at 131, the compression service may actually select a compression algorithm in response to space compression and decompression speed or efficiency. In other words, the compression service selectively determines one or more compression algorithms to use in compressing the data extents and the metadata. The selection may be based on how much the data is compressed (space compression) and how efficiently the compressed data can be decompressed (decompression speed). This permits different types of compression to be used on different portions of the data extents and the metadata and the compression may be different from other primary data of the database table that may be compressed. The type of compression algorithm used may be carried as an option with the compressed data for subsequent identification and decompression.

It is now understood how a compression service can selectively identify data extents and metadata for a database table that are infrequently accessed or used and that likely comprise a large amount of data. This traditionally uncompressed type of data is specifically compressed in a customizable fashion by the compression service. This permits the space utilization and processing efficiency for a large database table to be substantially improved without impacting usability or performance in any manner.

Figure 2:
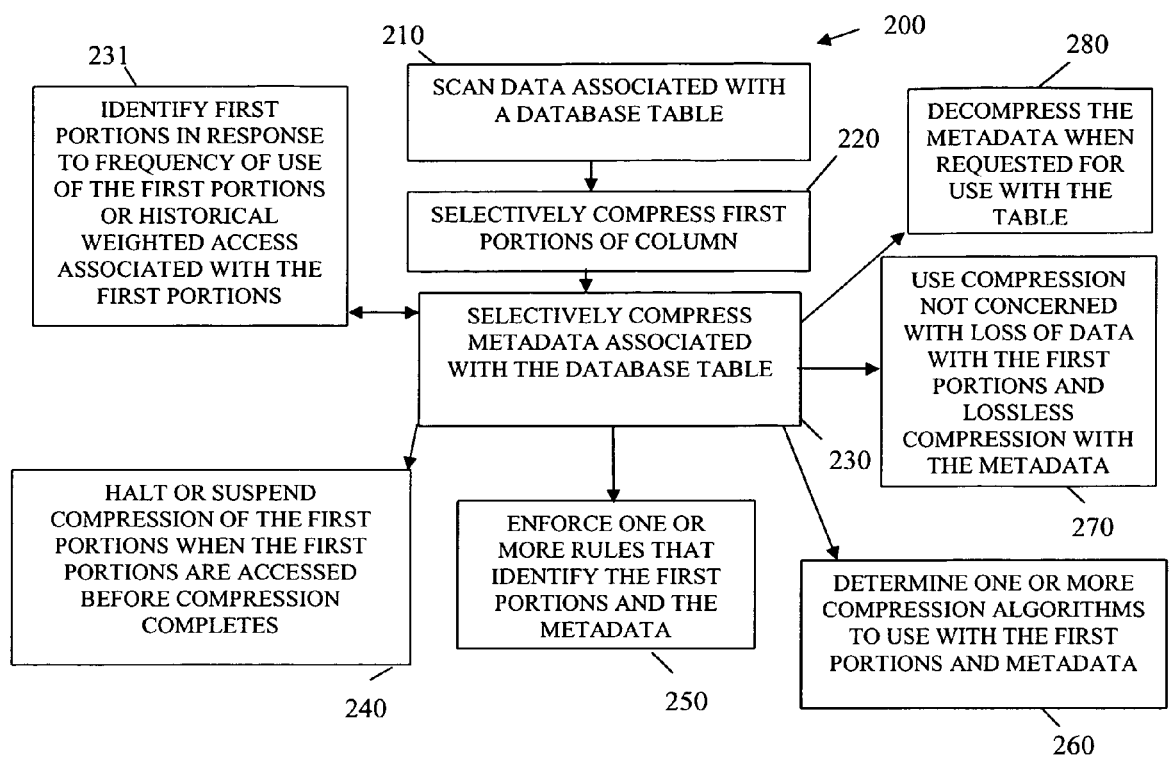
FIG. 2 is a diagram of another method for selectively compressing database information, according to an example embodiment.

FIG. 2 is a diagram of another method 200 for selectively compressing database information, according to an example embodiment. The method 200 (hereinafter "selective database compression service") is implemented in a machine-accessible and readable medium as instructions that when executed by a machine performs the processing reflected in FIG. 2. The selective database compression service may also be accessible over a network. The network may be wired, wireless, or a combination of wired and wireless. The selective database compression service presents another an enforcement perspective of the compression service represented by the method 100 of the FIG. 1.

At 210, the selective database compression service scans data associated with a database table. At 220, the selective database compression service selectively compresses first portions of a column. That is, a column or field of the database table includes first portions and remaining or second portions. The first portions are compressed by the selective database compression service while the second or remaining portions are not compressed at all. Thus, within a single column or field only a portion of the field is compressed. An example of this situation was discussed above with reference to the method 100 of the FIG. 1.

At 230, the selective database compression service also selectively compresses metadata associated with the database table. Examples of metadata that may be compressed were also discussed above with reference to the method 100 of the FIG. 1.

According to an embodiment, at 231, the selective database compression service may identify first portions of the column to compress in response to frequency of use of the first portions or historical weighted access associated with the first portions. In other words, the first portions may be identified by inspecting frequency statistics and even weighted historical access statistics for the first portions of the column. Examples of how frequency counts may be established and used were described in detail above with reference to the method 100 of the FIG. 1.

In some cases, at 240, the selective database compression service may dynamically or in real time halt or suspend compression of the first portions when the first portions are actually accessed before compression completes. So, if the first portions are suddenly used within the database table during compression of the column then compression can be backed out or halted. This can account for a situation where rules related to frequency of use were suddenly proven wrong due to changed circumstances, such that the compression is no longer desired for the first portions of the column.

According to an embodiment, at 250, the selective database compression service enforces one or more rules that assist in identifying the first portions and the metadata. Examples of rule enforcement were discussed above with reference to the method 100 of the FIG. 1. The selective database compression service uses and enforces rules that define circumstances that permit the first portions and metadata to be identified and compressed. Traditional compression would either compress the entire database table, an entire column within the database table, or none of the table at all; whereas the selective database compression service selectively compresses some first portions of a single column and some metadata.

In an embodiment, at 260, the selective database compression service determines one or more compression algorithms to use with the first portions and the metadata. So, different types of compression can be used for the first portions from that which is used with the metadata. Moreover, the compression algorithms may be optimally selected in response to the compressed size of data that the compression algorithms can produce and in response to the speed of efficiency with which the compressed data produced by the compression algorithms can be decompressed.

In still other situations, at 270, the selective database compression service may elect to use a compression technique not concerned with loss of data and use lossless compression with the metadata. For example, lossy compression permits loss of data during the compression and decompression; but, the selective database compression service may use any robust compression technique even more robust than lossy compression on the first portions of the column. This is useful in situations where the data being compressed is insignificant, such as would be the case when the first portions are unused in the column of the database table. Conversely, lossless compression retains the original data in compressed format and is likely more appropriate for use of compressing the metadata.

Also, at 280, the selective database compression service may decompress the metadata when the database table is requested for use. In other words, it may be that the metadata that was compressed is rarely if ever used; but, when it is used or requested the selective database compression service may dynamically decompress it for use or may enlist a third-party decompression service to assist in decompressing the metadata.

Figure 3:
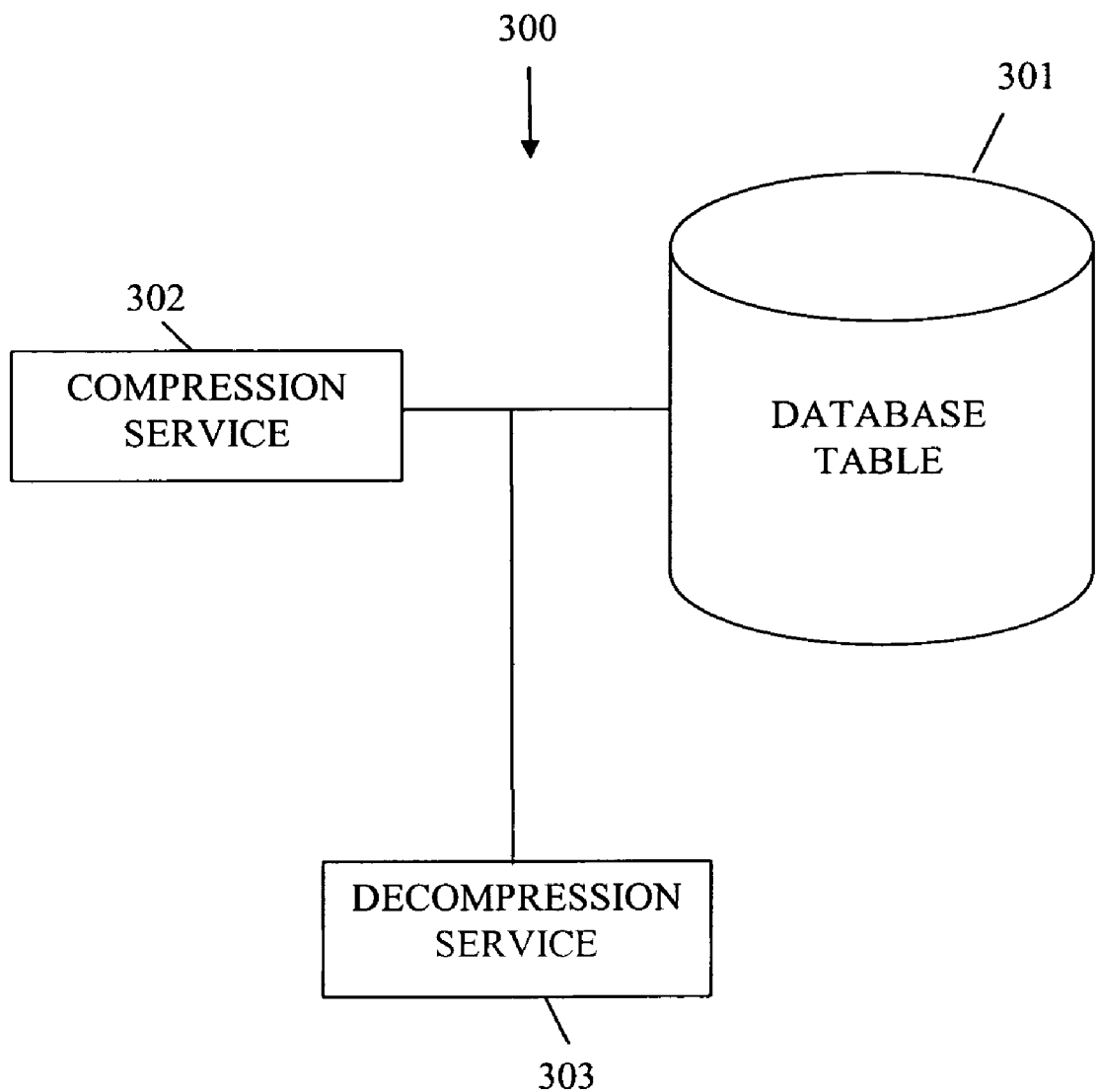
FIG. 3 is a diagram of a selective database compression system, according to an example embodiment.

FIG. 3 is a diagram of a selective database compression system 300, according to an example embodiment. The selective database compression system 300 is implemented in a machine-accessible and readable medium and is operational over a network. The network may be wired, wireless, or a combination of wired and wireless. In an embodiment, portions of the selective database compression system 300 implements, among other things the compression service and the selective database compression service represented by the methods 100 and 200 of the FIGS. 1 and 2, respectively.

The selective database compression system 300 includes a database table 301 and a compression service 302. The selective database compression system 300 may also include a decompression service 303. Each of these and their interactions with one another will now be discussed in turn.

The database table 301 is implemented in a database and is accessible from a machine-readable medium within a database. The database table 301 includes a plurality of rows and columns. At least one column includes first portions and second or remaining portions, where the first portions are largely unused and the second portions are used. The database table 301 also includes metadata about the columns and rows of the database table 301, such as statistics, definitions, etc.

The compression service 302 resides in a machine-readable medium and is to be processed by a machine (processing device). The compression service 302. The compression service 302 processes on the machine to selectively compress the first portions of the column for the database table 301. The compression service 302 also selectively compresses the metadata.

Example processing associated with the compression service 302 was described in detail above with reference to the methods 100 and 200 of the FIGS. 1 and 2.

According to an embodiment, the compression service 302 evaluates one or more rules for purposes of identifying the first portions of the column and to identify a type of compression algorithm to apply to the first portion. In some cases, the compression service 302 may use a different compression algorithm when compressing the first portions of the column from that which is used to compress the metadata. For example, a robust compression or lossy compression can be used with the first portions whereas a lossless compression is used with the metadata.

In an embodiment, the compression service 302 may also compress one or more of the following: data bytes used to align fields in a row of the database table 301; data bytes used to align rows due to file system addressing techniques; data bytes used in addressing structures that are unused when data blocks or extents are not fully populated; and data bytes between a collection of rows present due to fragmentation or lack of population.

The compression service 302 may also evaluate the frequency of use or weighted historical access when identifying the first portions and the metadata for compression. So, the compression service 302 may dynamically determine which portions of the database table 301 are good candidates for selective compression using frequency and weighted access statistics. This ensures that compression is achieved against data extents that are infrequently accessed. Thus, the decompression associated with accessing the compressed data occurs less frequently and is therefore efficient to do.

The selective database compression system 300 may also include a decompression service 303. The decompression service resides in a machine-readable medium and is to be processed by a machine (processing device). The decompression service 303 is used for decompressing the compressed first portions of the column and the metadata.

It is now appreciated how selective portions of database tables may be compressed. This can be done without compressing all the data associated with the database table and can be done by compressing types of data that are typically not compressed, such as sub portions or data extents within a single column, filler space between columns and rows, metadata, etc. When large databases are used the amount of space and efficiency achieved with this type of compression can be substantial.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable medium and to execute on a processing device to perform the method, comprising:
identifying data extents having infrequent use within a database table by comparing database statistics for the database table against a policy defining infrequent use as those data extents that were not accessed within a predefined number of days and the database statistics identifying when the data extents were last accessed in the database table, the data extents are just unused portions of a particular single database field within the database table where other portions of the single database field are used and not identified as the data extents and the data extents are pieces of data contiguously recorded in memory or storage and not fragmented for the database table and the data extents are identified as used data structures on file cylinders that have pieces of data with gaps or filler that separate each data extent on the file cylinders wherein a frequency of access for a particular data extent is compared to other data extents for the database table on access to the database table;
acquiring file system metadata for the database table;
selectively compressing the portions of the metadata and portions of the data extents, wherein the data extents are identified as alignment between fields in a row of the database table and alignment between rows in the database table, the portions of the metadata compressed via a lossless compression and the portions of the data extents compressed using lossy compression.

2. The method of claim 1, wherein selectively compressing further includes selecting a compression algorithm in response to space compression and decompression speed associated with the compression algorithm.

3. The method of claim 1, wherein identifying further includes applying one or more rules to assist in selectively identifying the data extents in response to one or more of the following: historical access, frequency of access, and weighted priority associated with access.

4. The method of claim 1, wherein identifying further includes determining that first parts of the data extents can be compressed using lossy techniques.

5. The method of claim 4, wherein selectively compressing further includes using a compression not concerned with loss of data on the first parts and a lossless compression on second parts of the data extents.

6. A non-transitory computer-readable medium having executable instructions that when executed on a processing device perform the method, comprising:
scanning data associated with a database table;
selectively compressing first portions of a single column for the database table while remaining portions of the single column remain uncompressed and are used in an uncompressed format, the selective compression is based on database statistics for the database table identifying last access to the first portions when compared to a policy, within the single column only the first portions are compressed, the first portions identified as data extents that are contiguously recorded in memory or storage and that are not fragmented, the data extents represent just unused portions of the single column for the database table, the first portions of the data extents compressed using lossy compression and the data extents are identified as used data structures on file cylinders that have pieces of data with gaps or filler that separate each data extent on the file cylinders wherein a frequency of access for a particular data extent is compared to other data extents for the database table on access to the database table; and
selectively compressing metadata associated with the database table using lossless compression.

7. The method of claim 6 further comprising, enforcing one or more rules that identify the first portions and the metadata, which are to be compressed.

8. The method of claim 6 further comprising using compression not concerned with loss of data with the first portions and lossless compression with the metadata.

9. The method of claim 6 further comprising, halting or suspending compression of the first portions when the first portions are accessed before compression has completed.

10. The method of claim 6 further comprising, decompressing the metadata when the metadata is requested for use with the database table.

11. The method of claim 6, wherein selectively compressing the first portions further include identifying the first portions in response to frequency of use of the first portions or historical weighted access associated with the first portions.

12. The method of claim 6 further comprising, determining one or more compression algorithms to use with the first portions and with the metadata.

* * * * *